United States Patent
Kosaki et al.

(10) Patent No.: US 9,252,410 B2
(45) Date of Patent: Feb. 2, 2016

(54) POWER STORAGE APPARATUS

(75) Inventors: Akihiro Kosaki, Aichi-ken (JP); Masaaki Iwabe, Toyota (JP); Kenji Iida, Nagoya (JP); Shinsuke Azuma, Aichi-ken (JP); Shigeyuki Ogasawara, Makinohara (JP)

(73) Assignees: Toyota Jidosha Kabushiki Kaisha, Toyota-shi, Aichi (JP); Yazaki Corporation, Tokyo (JP)

( * ) Notice: Subject to any disclaimer, the term of this patent is extended or adjusted under 35 U.S.C. 154(b) by 403 days.

(21) Appl. No.: 12/717,181

(22) Filed: Mar. 4, 2010

(65) Prior Publication Data
US 2010/0224403 A1 Sep. 9, 2010

(30) Foreign Application Priority Data
Mar. 6, 2009 (JP) .................................. 2009-054093

(51) Int. Cl.
*H02G 5/00* (2006.01)
*H01M 2/10* (2006.01)
*H01M 2/20* (2006.01)
(Continued)

(52) U.S. Cl.
CPC ............. *H01M 2/1083* (2013.01); *F16C 1/105* (2013.01); *F16C 1/262* (2013.01); *F16L 3/1041* (2013.01); *F16L 13/00* (2013.01); *H01M 2/10* (2013.01); *H01M 2/1005* (2013.01); *H01M*
(Continued)

(58) Field of Classification Search
CPC . H01M 2/1077; H01M 2/202; H01M 10/425; H01M 2/10; H01M 2/1005; H01M 2/1022; H01M 2/20; F16C 1/105; F16C 1/262; H01R 25/14; F16L 3/00; F16L 3/1041
USPC .................................................. 174/68.2, 480
See application file for complete search history.

(56) References Cited

U.S. PATENT DOCUMENTS 3,582,030 A * 6/1971 Barrett, Jr. .................... 248/68.1
4,213,589 A * 7/1980 Pierron et al. ............... 248/74.1
(Continued)

FOREIGN PATENT DOCUMENTS

| CN | 101209659 | 7/2008 |
|---|---|---|
| JP | 7-40877 | 2/1995 |

(Continued)

*Primary Examiner* — Hung S Bui
*Assistant Examiner* — James Wu
(74) *Attorney, Agent, or Firm* — Finnegan, Henderson, Farabow, Garrett & Dunner, L.L.P.

(57) ABSTRACT

A power storage apparatus includes a power storage module having a plurality of power storage elements which are aligned in one direction; a device placed adjacently to the power storage module in the direction of the alignment of the power storage elements; a high-voltage cable used in charge and discharge of the power storage module; and a support structure configured to support the high-voltage cable at a plurality of points to position the high-voltage cable along a reference path. The high-voltage cable is configured to electrically connect an electrode terminal of the power storage module to the device. The electrode terminal is one of two electrode terminals of the power storage module and is located on a farther side of the power storage module from the device.

6 Claims, 3 Drawing Sheets

(51) Int. Cl.
  *H01M 10/42* (2006.01)
  *F16L 13/00* (2006.01)
  *F16C 1/10* (2006.01)
  *F16C 1/26* (2006.01)
  *F16L 3/10* (2006.01)
  *H01R 25/14* (2006.01)
  *H01M 10/0525* (2010.01)
  *H01M 10/34* (2006.01)

(52) U.S. Cl.
  CPC .... *2/1022* (2013.01); *H01M 2/1077* (2013.01); *H01M 2/20* (2013.01); *H01M 2/202* (2013.01); *H01M 10/0525* (2013.01); *H01M 10/345* (2013.01); *H01M 10/425* (2013.01); *H01R 25/14* (2013.01); *Y02T 10/7011* (2013.01)

(56) References Cited

U.S. PATENT DOCUMENTS

| | | | |
|---|---|---|---|
| 6,261,719 B1* | 7/2001 | Ikeda et al. | 429/211 |
| 6,523,274 B1* | 2/2003 | Saito et al. | 33/562 |
| 6,809,257 B2* | 10/2004 | Shibuya | 174/481 |
| 7,604,507 B1* | 10/2009 | Millon | 439/627 |
| 2008/0173489 A1 | 7/2008 | Takasaki | |
| 2008/0280195 A1* | 11/2008 | Kumar et al. | 429/100 |

FOREIGN PATENT DOCUMENTS

| JP | 2006-228526 | | 8/2006 |
|---|---|---|---|
| JP | 2006228526 A | * | 8/2006 |
| JP | 2007-48515 | | 2/2007 |

* cited by examiner

POWER STORAGE APPARATUS

TECHNICAL FIELD

The present invention relates to a power storage apparatus including a high-voltage cable for use in charge and discharge of a power storage module.

BACKGROUND

In a battery module in which a plurality of cells are electrically connected in series, a negative cable and a positive cable are connected as high-voltage cables to electrode terminals (corresponding to a positive terminal and a negative terminal of battery module) in two particular cells in order to perform charge and discharge of the battery module (see, Japanese patent laid-open publication No. 2006-228526). The positive cable has one end connected to the positive terminal of the battery module and the other end connected to a device (for example, a relay). The negative cable has one end connected to the negative terminal of the battery module and the other end connected to the device (for example, a relay).

In the abovementioned conventional structure, it may be difficult to connect both ends of the high-voltage cable at predetermined connection positions due to the tolerance of the length of the high-voltage cable. For example, in a state in which the one end of the positive cable is connected to the positive terminal of the battery module, it may be difficult to connect the other end of the positive cable to the device.

SUMMARY

It is thus an object of the present invention to provide a power storage apparatus in which both ends of a high-voltage cable for use in charge and discharge of a power storage module can be easily connected at predetermined connection positions even when the high-voltage cable has a tolerance of a length direction.

A power storage apparatus according to the present invention comprises a power storage module including a plurality of power storage elements which are aligned in one direction and electrically connected with each other; a device placed adjacently to the power storage module in the direction of the alignment of the power storage elements; and a high-voltage cable used in charge and discharge of the power storage module. The high-voltage cable is configured to electrically connect an electrode terminal of the power storage module to the device. Herein the electrode terminal is one of two electrode terminals (positive terminal and negative terminal) of the power storage module and is located on a farther side of the power storage module from the device. In addition, the power storage apparatus comprises a support structure which is configured to support the high-voltage cable at a plurality of points to position the high-voltage cable along a reference path.

The reference path means a previously established path for placing the high-voltage cable to locate both ends of the high-voltage cable at predetermined positions. On the other hand, the above-mentioned support structure can be provided for a bus bar module for electrically connecting the plurality of power storage elements. This can reduce the number of parts to achieve cost cutting.

According to the present invention, the high-voltage cable can be placed along the reference path and both ends of the high-voltage cable can be located at the predetermined positions even when the high-voltage cable has the tolerance of the length direction. Thus, both ends of the high-voltage cable can be easily connected to the electrode terminal of the power storage module and the device.

DETAILED DESCRIPTION

An embodiment of the present invention will hereinafter be described.

[Embodiment 1]

Figure 1:
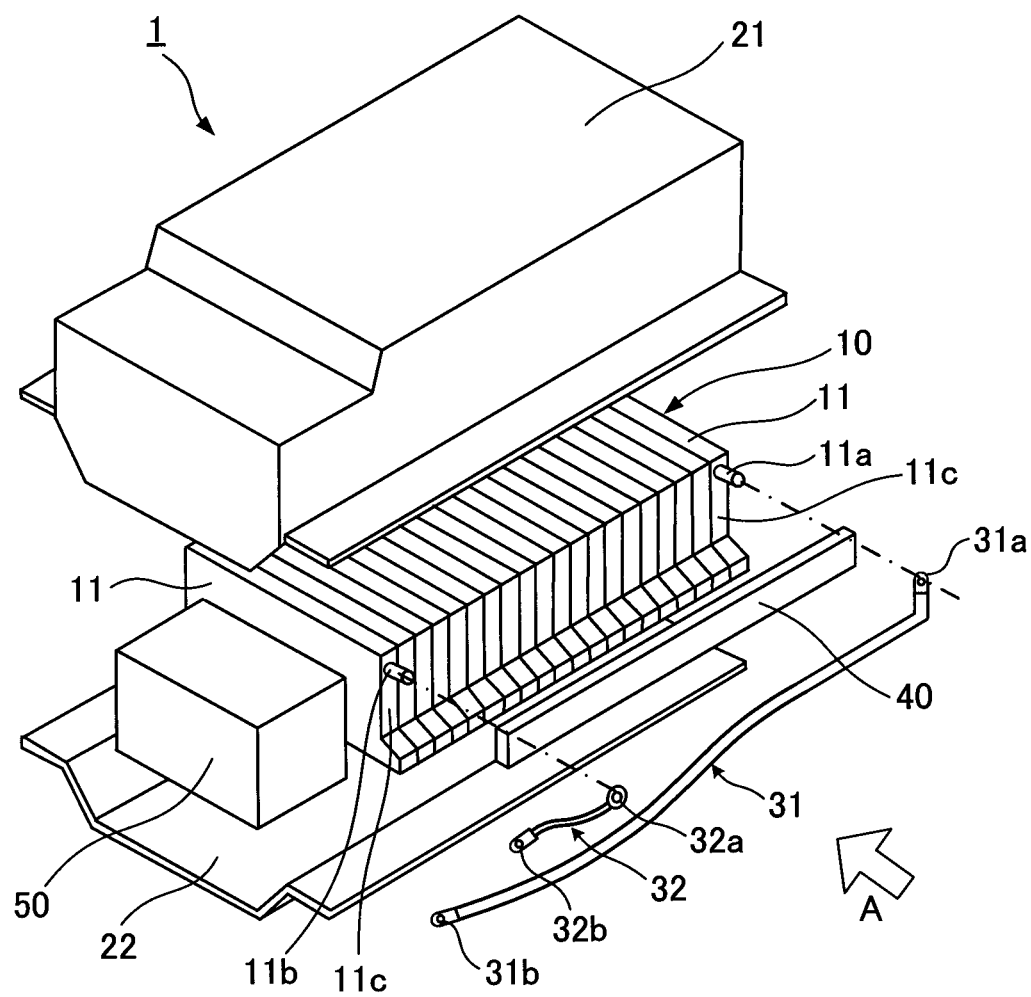
FIG. 1 is an exploded view showing the structure of a battery pack which is Embodiment 1 of the present invention.

The structure of a battery pack (power storage apparatus) which is Embodiment 1 of the present invention will be described with reference to FIG. 1 which is an exploded view showing the structure of the battery pack. The battery pack of the present embodiment can be mounted on a vehicle. The types of the vehicle include a hybrid vehicle and an electric vehicle. The hybrid vehicle is a vehicle which includes an internal combustion engine or a fuel cell in addition to the battery pack as a power source for generating the running energy (kinetic energy) of the vehicle. The electric vehicle is a vehicle which runs by using only the output from the battery pack.

The battery pack 1 has a battery module (power storage module) 10 which is formed of a plurality of cells (power storage elements) 11 electrically connected in series. The plurality of cells 11 are aligned in one direction, and a spacer (not shown) is placed between adjacent two of the cells 11. The spacer provides space for moving air or the like used to control the temperature of the cell 11 between the two adjacent cells 11.

Serving as the cell 11, a secondary battery such as a nickel metal hydride battery and a lithium-ion battery can be used. Alternatively, an electric double layer capacitor can be used instead of the secondary battery. The number of the cells 11 constituting the battery module 10 can be set as appropriate based on the output performance which should be achieved by the battery module 10. In the present embodiment, the plurality of cells 11 are aligned in one direction, the present invention is not limited thereto. For example, a battery unit integrally constituted by the plurality of cells 11 is prepared and the plurality of battery units can be aligned in one direction. In this case, the plurality of cells 11 constituting battery unit are electrically connected with each other.

Although not shown, a pair of end plates is placed at both ends of the battery module 10 in the direction in which the cells 11 are arranged. A restraint rod which extends in the arrangement direction of the cells 11 is connected to the pair of end plates. This applies force (restraint force) to the plurality of cells 11 constituting the battery module 10 and the force acts in a direction in which the adjacent two cells 11 are brought closer to each other. The restraint force can suppress thermal expansion of the cells 11.

A positive terminal 11a and a negative terminal 11b are provided for two side face portions 11c in each of the cells 11. FIG. 1 shows only one of the side face portions 11c in each cell 11. In addition, in FIG. 1, the positive terminals and the negative terminals are omitted in some of the cells 11. The positive terminal 11a of each cell 11 is electrically connected to the negative terminal 11b of the adjacent cell 11.

Figure 2:
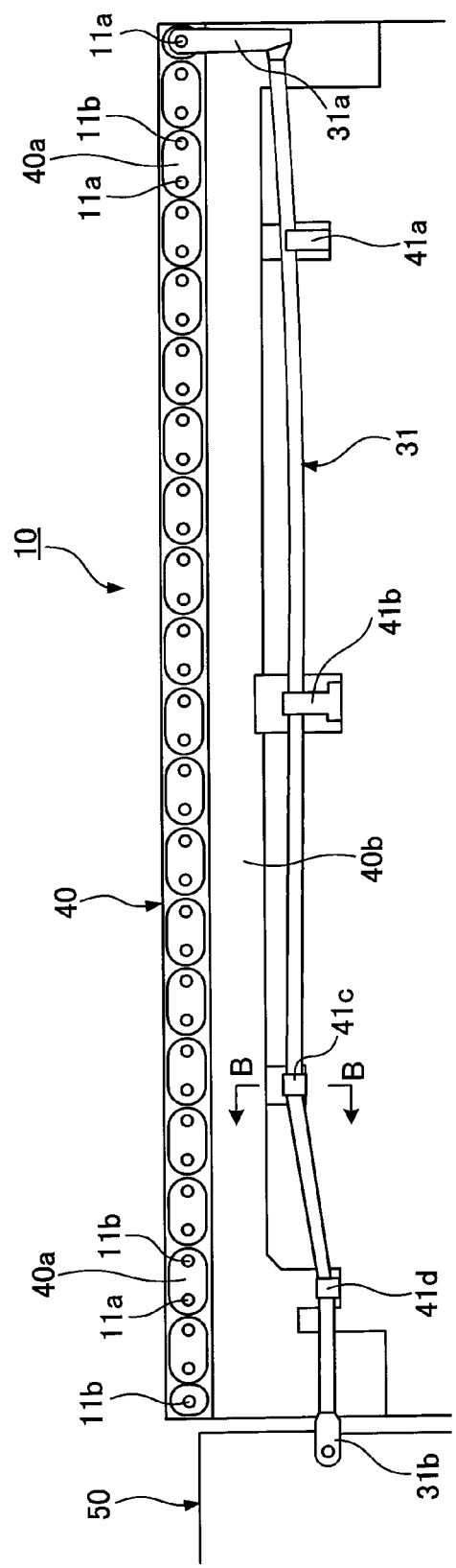
FIG. 2 is a side view showing part of the battery module in Embodiment 1 when viewed from a direction indicated by an arrow A in FIG. 1.

A bus bar module 40 is used to connect electrically in series the plurality of cells 11 constituting the battery module 10. The bus bar module 40 is provided at a position opposite to each of the two side face portions 11c of the each cell 11. FIG. 1 shows only one of the two bus bar modules 40. As shown in FIG. 2, the bus bar module 40 has a plurality of bus bars 40a for electrically connecting the positive terminals 11a to the associated negative terminals 11b, and a base 40b for holding the bus bars 40a. Each of the bus bars 40a is made of a material having electrical conductivity (for example, metal). The base 40b is made of a nonconductive material (for example, resin).

Of the plurality of cells 11 constituting the battery module 10, the cell 11 placed at one end in the arrangement direction of the cells 11 (the cell 11 farthest from a device box 50) has the positive terminal 11a which serves as a positive terminal of the battery module 10. A positive cable (high-voltage cable) 31 for use in charge and discharge of the battery module 10 is connected to the positive terminal 11a. Specifically, a connection terminal 31a provided at one end of the positive cable 11a is in contact with the bus bar 40a of the bus bar module 40 that is connected to the positive terminal 11a of the battery module 10.

Of the plurality of cells 11 constituting the battery module 10, the cell 11 placed at the other end in the arrangement direction of the cells 11 (the cell 11 closest to the device box 50) has the negative terminal 11b which serves as a negative terminal of the battery module 10. A negative cable (high-voltage cable) 32 for use in charge and discharge of the battery module 10 is connected to the negative terminal 11b. Specifically, a connection terminal 32a provided at one end of the negative cable 32 is in contact with the bus bar 40a of the bus bar module 40 that is connected to the negative terminal 11b of the battery module 10.

The device box 50 is placed at a position adjacent to the battery module 10 in the arrangement direction of the cells 11. The device box 50 accommodates, for example, a battery monitoring unit for monitoring the voltage, the temperature and the like of the cells 11, a service plug for interrupting the passage of electric current through the battery module 10, an electric-current sensor for detecting electric current in the cells 11, and relays. In the present embodiment, a connection terminal 31b provided at the other end of the positive cable 31 and a connection terminal 32b provided at the other end of the negative cable 32 are connected at their predetermined connection positions to the relays in the device box 50, respectively.

In the present embodiment, the output (direct-current power) from the battery module 10 is boosted by a DC/DC converter, converted into alternating-current power by an inverter, and then supplied to a motor generator. This drives the motor generator to produce the running energy (kinetic energy) of the vehicle. On the other hand, for braking the vehicle, the power (alternating-current power) produced by the motor generator is converted into direct-current power by the inverter, stepped down by the DC/DC converter, and then supplied to the battery module 10. Thus, the battery module 10 is charged.

The battery module 10 and the device box 50 are surrounded by an upper case 21 and a lower case 22. In other words, the upper case 21 and the lower case 22 are fixed to each other by a fastening member such as bolts to provide space for accommodating the battery module 10 and the device box 50. The battery module 10 and the device box 50 are fixed to the lower case 22 by a fastening member.

Figure 3:
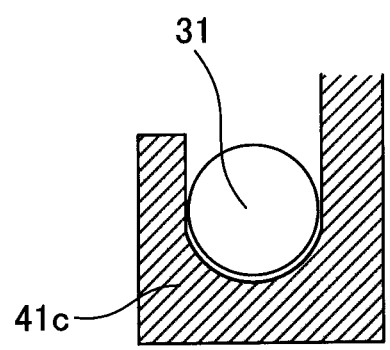
FIG. 3 is a section view showing the structure of a support portion provided for a bus bar module in Embodiment 1 and taken along a line B-B in FIG. 2.

Next, description will be made of a support structure for the positive cable 31 in the battery pack 1 of the present embodiment with reference to FIGS. 2 and 3. FIG. 2 is a side view showing the structure of part of the battery module 10 when viewed from a direction indicated by an arrow A in FIG. 1. FIG. 3 is a section view showing the structure of a support portion for supporting the positive cable 31 and taken along a line B-B in FIG. 2.

A plurality of (four) support portions 41a to 41d are formed integrally with the base 40b of the bus bar module 40. These support portions 41a to 41d are provided on a surface of the bus bar module 40 that is opposed to a side face of the upper case 21. The positive terminal 11a of the battery module 10 electrically connected to the connection terminal 31a of the positive cable 31 is located above the portion of the device box 50 that is connected to the connection terminal 31b. In the present embodiment, as shown in FIG. 2, the level at which the positive cable 31 is located is lowered stepwise from the connection terminal 31a toward the connection terminal 31b.

As shown in FIG. 3, the support portion 41c has a structure to catch the positive cable 31. Part of the surface (inner wall surface) of the support portion 41c that is in contact with the positive cable 31 is formed to have a shape conforming to the outer peripheral surface of the positive cable 31. In the present embodiment, the positive cable 31 can be fitted from above to the support portion 41c. Part of the positive cable 31 is brought into contact with the support portion 41c to perform the positioning of the positive cable 31.

While the bus bar module 40 has the support portions 41a, 41b, and 41d having different shapes from that of the support portion 41c, the functions of the support portions 41a, 41b, and 41d are the same as that of the support portion 41c. Specifically, the positive cable 31 is fitted from above to each of the support portions 41a, 41b, and 41d, and each of the support portions 41a, 41b, and 41d is formed to catch the positive cable 31. Part of the surface (inner wall surface) of each of the support portions 41a, 41b, and 41d that is in contact with the positive cable 31 is formed to have a shape conforming to the outer peripheral surface of the positive cable 31.

In the structure in which the positive cable 31 is used to connect electrically the positive terminal 11a of the battery module 10 to the relay in the device box 50, it may be difficult to connect the connection terminals 31a and 31b of the positive cable 31 at predetermined connection positions due to the tolerance of the length of the positive cable 31. For example, for connecting the connection terminal 31b of the positive cable 31 to the device box 50 after the connection terminal 31a is connected to the positive terminal 11a of the battery module 10, it may be difficult to locate the connection terminal 31b at a predetermined connection portion in the device box 50.

In the present embodiment, the support portions 41a to 41d for supporting the positive cable 31 are provided in the plane in which the positive cable 31 is placed, in other words, on the surface of the bus bar module 40, such that the positive cable 31 is placed along a predetermined path (reference path). The reference path means a previously established path for placing the positive cable 31 to connect the connection terminal 31a to the positive terminal 11a of the battery module 10 and to connect the connection terminal 31b to the predetermined connection portion in the device box 50.

The positive cable 31 is placed along the reference path in this manner to allow easy connection of the connection terminal 31a to the positive terminal 11a of the battery module 10 and easy connection of the connection terminal 31b to the predetermined connection portion in the device box 50. In other words, it is possible to reduce variations in the position where the positive cable 31 is placed and thus to prevent the difficulty in connecting the connection terminals 31a and 31b at the predetermined connection positions due to the tolerance of the length of the positive cable 31.

When the positive cable 31 is longer than the reference path, part of the positive cable 31 can be sagged. For example, the portion of the positive cable 31 that is placed between the two support portions 41a and 41b can be sagged. This can prevent displacements of the connection terminals 31a and 31b of the positive cable 31. The sagged portion of the positive cable 31 is not limited to the portion placed between the two support portions 41a and 41b but can be any portion placed between the other support portions.

In the present embodiment, the positive cable 31 has already been attached to the bus bar module 40 when the bus mar module 40 is mounted on the battery module 10, so that the battery pack 1 can be easily assembled. In other words, since the positive cable 31 can be positioned in advance by the bus bar module 40, the positive cable 31 can be easily mounted.

While the positive terminal 11a of the battery module 10 is located above the connection portion of the device box 50 to the positive cable 31 (connection terminal 31b) in the present embodiment, the present invention is not limited thereto. Specifically, the positive terminal 11a of the battery module 10 and the abovementioned connection portion of the device box 50 can be placed at substantially the same level, or the abovementioned connection portion of the device box 50 can be located above the positive terminal 11a of the battery module 10. In either case, the positive cable 31 can be placed along the predetermined reference path by using the support portions 41a to 41d described in the present embodiment.

While the positive terminal 11a of the battery module 10 is provided at the position farthest from the device box 50 in the arrangement direction of the cells 11 in the present embodiment, the present invention is not limited thereto. Specifically, the positive terminal 11a of the battery module 10 can be placed at a position adjacent to the device box 50 and the negative terminal 11b of the battery module 10 can be placed at a position farthest from the device box 50. In this case, the negative cable 32 can be supported by the plurality of support portions 41a to 41d formed in the bus bar module 40.

While the support portions 41a to 41d for supporting the positive cable 31 are provided for the bus bar module 40 in the present embodiment, the present invention is not limited thereto. Specifically, it is essential only that the support portions for supporting the positive cable 31 at a plurality of points should be provided within a plane on which the positive cable 31 is placed, and these support portions can be provided in a member different from the bus bar module 40. However, the support portions 41a to 41d formed in the bus bar module 40 allow the bus bar module 40 to have the function of electrically connecting the plurality of cells 11 and the function of supporting the positive cable 31. In other words, the number of parts can be decreased to reduce the size of the battery pack 1.

While the high-voltage cable (positive cable 31) is placed along the side portions 11c of the cells 11 in the present embodiment, the present invention is not limited thereto. Specifically, the present invention is applicable when the high-voltage cable is placed along upper surfaces of the cells 11. In other words, it is essential only that the support portions for supporting the high-voltage cable at a plurality of points should be provided within a plane on which the high-voltage cable is placed. These support portions can be formed integrally with the upper surfaces of the cells 11 or can be formed in a member different from the cells 11.

What is claimed is:

1. A power storage apparatus comprising:
    a power storage module including a plurality of power storage elements which are aligned in one direction;
    a bus bar module configured to electrically connect the power storage elements;
    a device placed adjacently to the power storage module in the direction of the alignment of the power storage elements;
    a high-voltage cable used in charge and discharge of the power storage module and configured to electrically connect a first electrode terminal of the power storage module to the device, the first electrode terminal being one of two electrode terminals of the power storage module and being located on a farther side of the power storage module from the device; and
    a connection terminal mechanically connected to the first electrode terminal and having an elongate shape that extends downward from the first electrode terminal,
    wherein:
    an end face of the high-voltage cable is directly connected to a side edge of a lower portion of the connection terminal,
    the bus bar module includes a plurality of support portions supporting the high-voltage cable at a plurality of points, each support portion of the plurality of support portions including inner wall surfaces defining a directly upward facing opening;
    the inner wall surfaces include first and second substantially planar surfaces, the first and second substantially planar surfaces being substantially parallel to one another in the region of the opening;
    the bus bar module positions the high-voltage cable along a reference path;
    the bus bar module is configured such that when the bus bar module electrically connects the power storage elements, the high-voltage cable is fittable from above the bus bar module into each of the support portions;
    the high-voltage cable is arranged between the first and second substantially planar surfaces and is in direct contact with each of the first and second substantially planar surfaces;
    the first and second substantially planar surfaces form a space therebetween, the space allowing movement of the high-voltage cable in upward and downward directions when the plurality of support portions support the high-voltage cable; and
    the high-voltage cable is arranged along a straight line from the side edge of the lower portion of the connection terminal to the support portion of the plurality of support portions located nearest to the connection terminal.

2. The power storage apparatus according to claim 1, wherein:
    the bus bar module has a plurality of bus bars configured to electrically connect the power storage elements, and
    the support portions are provided on one surface of the bus bar module opposite to other surface of the bus bar module facing the power storage elements.

3. The power storage apparatus according to claim 1, wherein a connecting position of the connection terminal and the first electrode terminal is located above a connecting position of the high-voltage cable and the device, and
    wherein the plurality of support portions lower a level where the high-voltage cable is located from the connecting position of the connection terminal and the first electrode terminal toward the connecting position of the high-voltage cable and the device.

4. The power storage apparatus according to claim 1, wherein when the bus bar module electrically connects the power storage elements, the bus bar module is positioned in a vertical direction and includes a top portion and a bottom portion; and wherein the top portion of the bus bar module electrically connects the power storage elements and the bottom portion of the bus bar module includes the plurality of support portions.

5. The power storage apparatus according to claim 4, wherein when the bus bar module electrically connects the power storage elements, the high-voltage cable is fittable from the top portion of the bus bar module into each of the support portions located in the bottom portion.

6. A power storage apparatus comprising:
 a power storage module including a plurality of power storage elements which are aligned in one direction;
 a bus bar module configured to electrically connect the power storage elements;
 a device placed adjacently to the power storage module in the direction of the alignment of the power storage elements;
 a high-voltage cable used in charge and discharge of the power storage module and configured to electrically connect a first electrode terminal of the power storage module to the device, the first electrode terminal being one of two electrode terminals of the power storage module and being located on a farther side of the power storage module from the device; and
 a connection terminal mechanically connected to the first electrode terminal and having an elongate shape that extends downward from the first electrode terminal, wherein:
 an end face of the high-voltage cable is directly connected to a side edge of a lower portion of the connection terminal,
 the bus bar module includes a plurality of support portions supporting the high-voltage cable at a plurality of points, each support portion of the plurality of support portions including inner wall surfaces defining a directly upward facing opening;
 the inner wall surfaces include first and second substantially planar surfaces, the first and second substantially planar surfaces being substantially parallel to one another in the region of the opening;
 the bus bar module positions the high-voltage cable along a reference path;
 the bus bar module is configured such that when the bus bar module electrically connects the power storage elements, the high-voltage cable is fittable from above the bus bar module into each of the support portions;
 the high-voltage cable is arranged between the first and second substantially planar surfaces and is in direct contact with each of the first and second substantially planar surfaces;
 the first and second substantially planar surfaces form a space therebetween, the space allowing movement of the high-voltage cable in upward and downward directions;
 each support portion of the plurality of support portions has a different shape and size than other support portions of the plurality of support portions; and
 the high-voltage cable is arranged along a straight line from the side edge of the lower portion of the connection terminal to the support portion of the plurality of support portions located nearest to the connection terminal.

* * * * *